United States Patent [19]
Watkins

[11] Patent Number: 5,257,671
[45] Date of Patent: Nov. 2, 1993

[54] VEHICLE

[76] Inventor: Jonathan Watkins, 3740 Bluebird Canyon Rd., Vista, Calif. 92084

[21] Appl. No.: 619,014

[22] Filed: Nov. 28, 1990

[51] Int. Cl.$^5$ .............................................. B62D 61/12
[52] U.S. Cl. ................................... 180/209; 180/219; 280/755; 280/767
[58] Field of Search ...................... 180/219, 227, 228; 280/43.21, 64, 288.1, 301, 303, 755, 763.1, 767; 254/108, 105, 9 B, 9 C, 9 R, 89 R; 74/141.5, 143

[56] References Cited

U.S. PATENT DOCUMENTS

| | | | |
|---|---|---|---|
| 54,706 | 5/1866 | Fasig | 254/105 |
| 1,501,304 | 7/1924 | Boehm . | |
| 1,802,050 | 4/1931 | Duresen | 180/227 |
| 1,858,743 | 5/1932 | Langstreth | 180/227 |
| 2,526,263 | 10/1950 | Neal | 74/143 |
| 3,236,323 | 2/1966 | Austin . | |
| 3,700,059 | 10/1972 | Sutton | 180/227 |
| 4,133,402 | 1/1979 | Soo Hoo | 180/30 |
| 4,293,052 | 10/1981 | Daswick et al. | 180/219 |
| 4,313,511 | 2/1982 | Soo Hoo | 180/21 |
| 4,513,837 | 4/1985 | Archer | 180/209 |
| 4,691,798 | 9/1987 | Engelbach | 180/209 |
| 4,700,962 | 10/1987 | Salmon | 280/288.1 |
| 5,048,864 | 9/1991 | Geiger | 280/755 |

FOREIGN PATENT DOCUMENTS

| | | | |
|---|---|---|---|
| 1166804 | 11/1958 | France | 280/293 |
| 0114076 | 4/1990 | Japan | 180/219 |

*Primary Examiner*—Margaret A. Focarino
*Assistant Examiner*—Anne Marie Boehler
*Attorney, Agent, or Firm*—Price, Gess & Ubell

[57] ABSTRACT

A vehicle having a chassis frame, a single front and a single rear wheel aligned on the longitudinal axis of the vehicle, and retractible outrigger wheels on opposite sides of the frame. A driver compartment supported by the frame and a driver foot pedal inside the compartment. Connection apparatus including ratchet and pawl instrumentalities connecting the foot pedal to the outrigger wheels to move them up and down in two full depressions of the foot pedal. The first depression lowers the outrigger wheels to a first position about half way to full lowering of the outrigger wheels which is suitable for low speed operation. The second depressions lowers the outrigger wheels to a second fully lowered position which is suitable for stopping. The force of the feet required to fully lower the outrigger wheels in two strokes when the vehicle is leaned over with the weight applied to one of the outrigger wheels being generally half of the force required to fully lower the outrigger wheels in one stroke. A hand grip on each side of the driver compartment, a front fork pivotally supporting the front wheel, and motion transfer apparatus from each hand grip extending on each side of the driver compartment and connecting to the front fork, whereby steering is accomplished by the driver pushing and pulling on the hand grips. A swing arm pivotally mounting bearings for the rear wheel with the pivotal axis of the swing arm located rearwardly of the rear wheel. The outrigger wheels have axles located in generally the same vertical plane lateral of the vehicle as the rear wheels axles when the outrigger wheels are in down position. The frame includes side trusses disposed generally in horizontal planes and located on each side of the driver compartment at about elbow height and diagonal frame members at front and back of the driver compartment tying together the side trusses thereby forming a complete trusswork about the compartment to protect the driver.

2 Claims, 8 Drawing Sheets

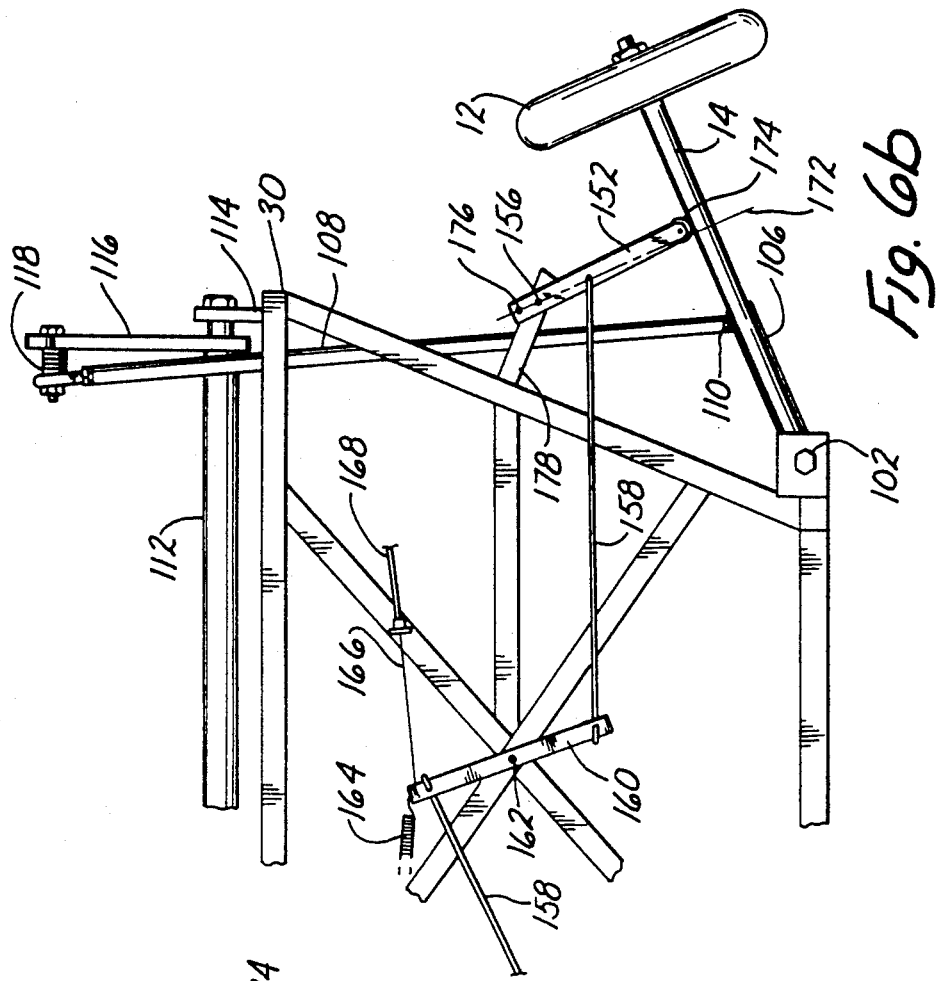
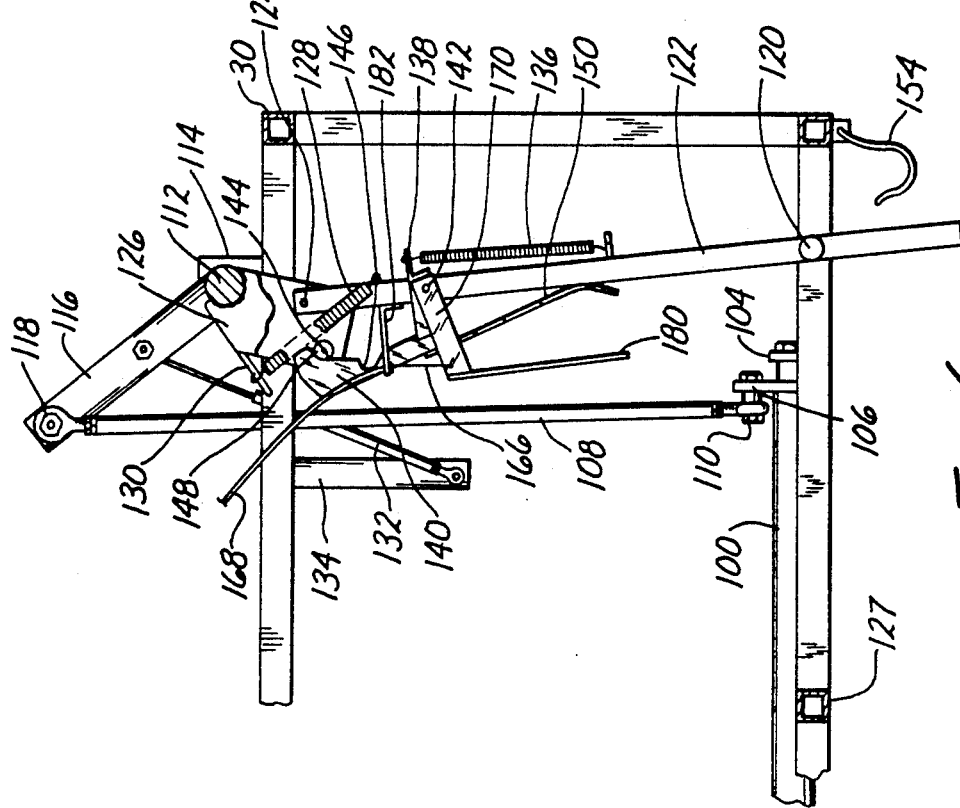

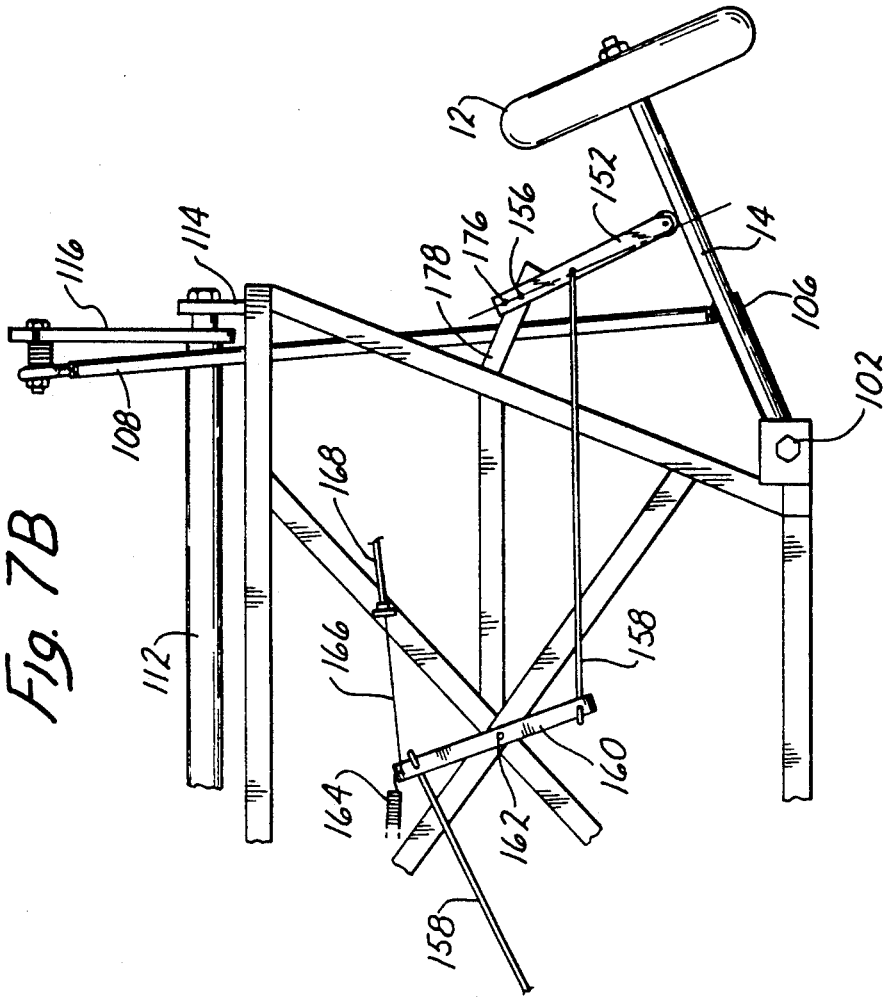
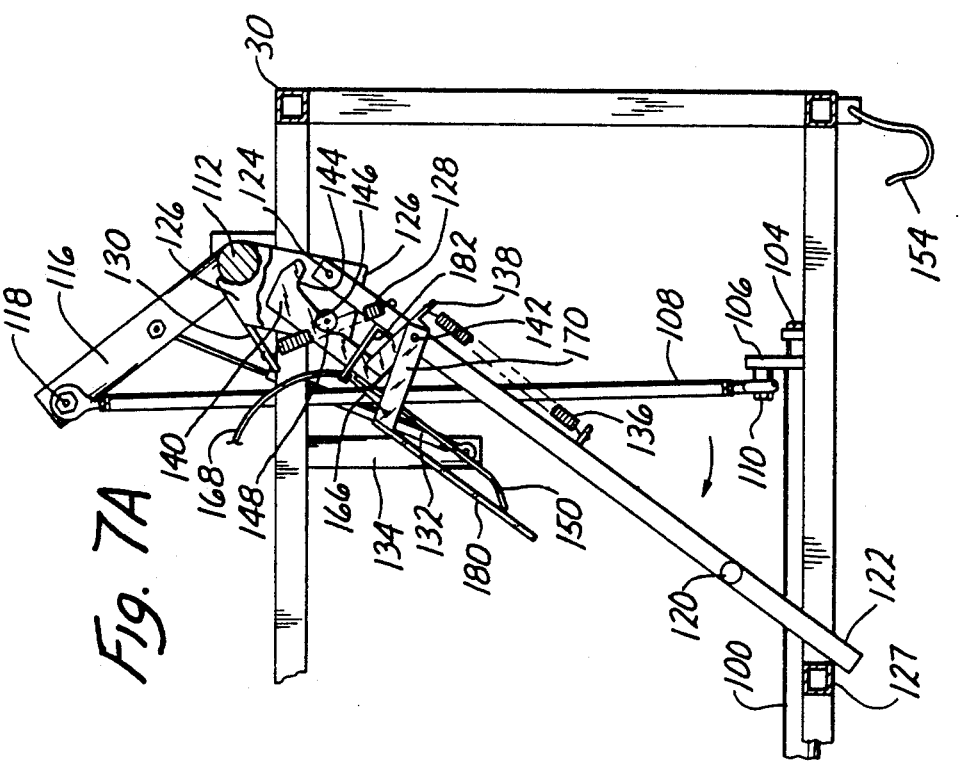

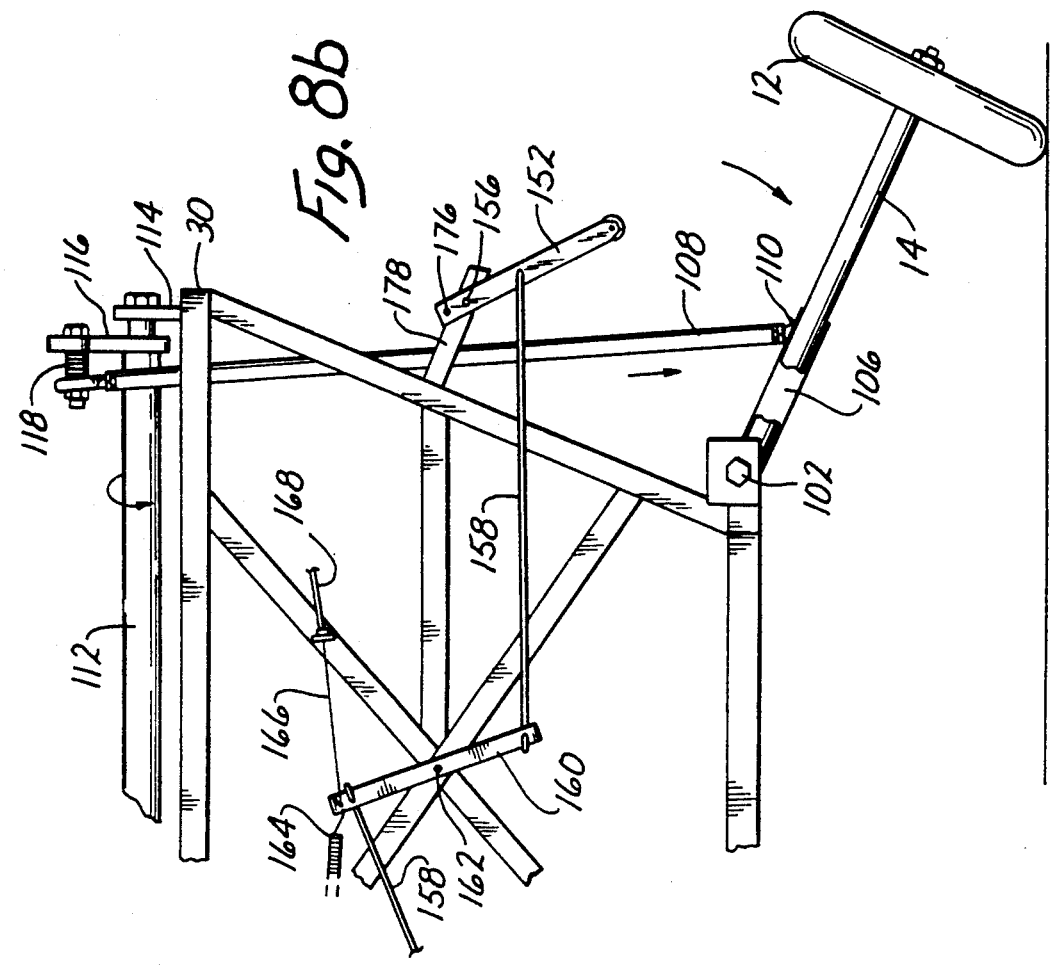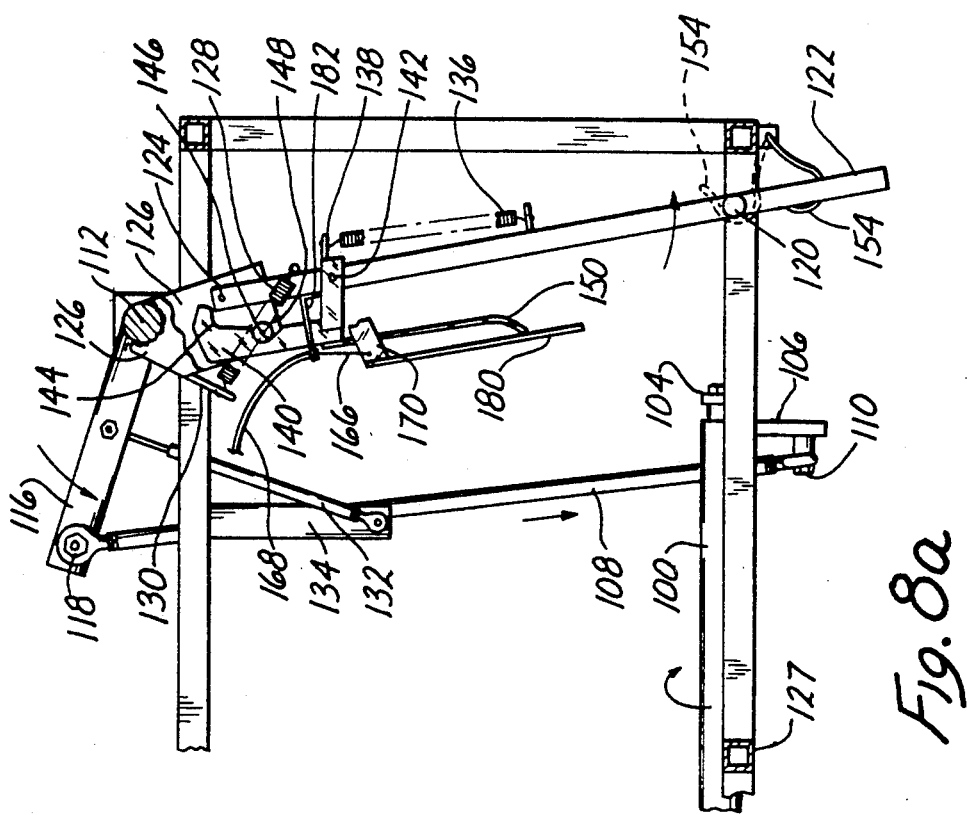

VEHICLE

BRIEF SUMMARY OF THE INVENTION, BACKGROUND AND OBJECTIVES

My invention relates to a motor vehicle of the type having a chassis frame elongated in a fore and aft direction, a single front and a single rear wheel, and retractable outrigger wheels on opposite sides of the frame.

It is an object of my invention that the outrigger wheels or landing gear serve the following functions:
(a) Hold the vehicle upright when it is stopped or moving slowly.
(b) Create a righting force to aid the vehicle driver in the transition from unbalanced to balanced driving.
(c) Permit a maximum lean angle of about forty degrees either side of vertical for safe higher speed driving.
(d) Permit restriction to a lesser lean angle, i.e., twenty-five degrees for around town and stop and go driving and driver training.

Prior vehicles of this type have lacked the ability to retract outrigger wheels far enough to allow for a vehicle lean angle of about forty degrees. An outrigger wheel retraction system which limits lean angle to only twenty degrees, for example, means the structure involved in the outrigger wheels, even when retracted, will strike the ground when the vehicle rounds turns at moderate speeds. An inspection of currently produced motorcycle and motor scooter products will demonstrate the ability to lean forty or more degrees to either side of vertical. This is a standard design feature, and for good reason.

A two-wheeled vehicle in motion, like a motorcycle, is dynamically balanced, and to turn a corner it will lean at an angle determined by the radius of the corner and the velocity of the vehicle, which will define a safe condition as long as tire adhesion to the road surface is maintained. While forty degrees lean is more lean than the average operator will plan to normally use, misjudgment of a corner's sharpness will require more lean on occasion to safely turn the corner than normally desired. This extra margin to lean (safety margin) must be designed into the vehicle. For this same reason automobiles are capable of rounding corners at far higher speeds than planned daily use requires. Emergency conditions and the unexpected may require a sharper than normally desired turn. If the maximum lean angle is much less than forty degrees, the vehicle has an unsafe turn radius limitation, which forces a wider turn than would be allowed with a greater lean angle. In an unexpected condition, if the lean angle is limited and a sharper turn is attempted than the vehicle maximum lean angle will allow, the vehicle will be forced into a wider turn, out of its intended lane of travel, and cross either into the adjacent lane or road shoulder depending on direction of the turn. Thus, the vehicle could be forced into a lane of oncoming traffic or off the road, both of which would involve unacceptable risk.

It is a further object of my invention to provide means to right the vehicle when stationary or moving slowly from as much as about a forty degree lean angle by force applied by the feet of the driver on pedals, within the normal levels of strength of grown people. The greater the lean angle, the greater the force required to right a vehicle.

It is an object of my invention to provide such means to right the vehicle with a mechanism having the following characteristics:
(a) Variable ratio righting leverage.
(b) Dividing righting action into two segments so that the driver can use two foot pedal strokes of his legs to fully right the vehicle from about a forty degree lean.
(c) Providing a half-retracted outrigger wheel position for around-town and stop-and-go travel and driver training, which is achieved by one foot pedal stroke.

Further objectives include:
(a) Automobile comfort and safety.
(b) Driving enjoyment akin to that experienced with a motorcycle, economy, ease of maintenance, providing a vehicle qualifying for diamond lane privileges, providing a vehicle of lower ecological damage compared with other feasible vehicle alternatives.

Automobile comfort is achieved by providing basically an automobile type seat and seating position, as contrasted to motorcycle seats and driving positions. It is an objective to provide glass and body screening such as may be found in a convertible, as opposed to the wind buffeting and noise found in a motorcycle. A heater can be provided.

Automobile safety can be enhanced by a seat belt and a shoulder harness, by a tubular steel cage and a roll cage, or by a comparable safe body construction. Use of a driving helmet is preferable. An air bag passive retraint also could be provided.

Motorcycle type ride enjoyment is created because operating the vehicle is like operating a very responsive motorcycle, with an exception that the feet never have to touch the pavement during use. Motorcycle economy is inherent in the small and efficient motorcycle-like motor, the vehicle's low weight, and the provision of low drag with the two wheels. Maintenance is easier due to fewer and less complicated parts. Small and efficient power plants burn less gas and create less emissions.

The technology exists to develop my vehicle. Although prior somewhat similar vehicles were proposed starting as early as about 1924, apparently full scale production has not been achieved. One difficulty may have been the failure to create a system for righting the vehicle within the strength capabilities of normal drivers. It is an objective of my invention to provide a two stroke mechanism to right the vehicle.

It is another objective of my invention:
(a) To provide outrigger wheels replacing the rider's feet to hold the vehicle upright at stops and at low speed, the wheels to be retracted at other occasions.
(b) To permit forty degrees or more vehicle lean to either side when the outrigger wheels are retracted.
(c) To operate the outrigger wheels by reasonable foot pressure.
(d) To permit about twenty-five degrees vehicle lean for around town and stop-and-go driving.
(e) To provide a down lock for the outrigger wheels for parking.
(f) To provide side steering for ease of driver entry into the vehicle and on leaving the vehicle, and to direct the steering linkage away from the driver during accidents.
(h) Roll bar and other safety construction.

Vehicle operating conditions are much like that of a motorcycle with certain exceptions:
(a) A leg-powered outrigger wheel system is substituted for the direct use of the driver's feet to touch the ground to balance the vehicle during low speeds and stops.

(b) When a rider uses a motorcycle, he learns to position the motorcycle in a balanced condition as it sets into motion. My vehicle is operated somewhat differently in this regard. Leg power is still used but through foot pedals and mechanical advantage, in a two-stroke system. My vehicle could be driven in an dynamically unbalanced condition at any speed but it is desirable to transition to the balanced mode at 5-10 mph. The faster the vehicle is driven, the more leg power is required to correct the vehicle if it is in an undesirable disposition.

(c) Seating the driver high in a motorcycle is disadvantageous compared to the low seating position in my vehicle. The lower position of the weight of the driver (in a vehicle in which his weight is a significant portion of overall vehicle/occupant weight) leads to more responsive handling and safety due to a lower center of gravity.

My invention will be best understood, together with additional objectives and advantages thereof, from the following description, read with reference to the drawings, in which:

DRAWINGS

FIG. 6(a) is an elevational view of the foot pedal and associated parts in a second position.

FIG. 6(b) is an elevational view of the outrigger wheel and associated parts in positions they may assume when the foot pedal is in the position shown in FIG. 6(a).

FIG. 7(a) is an elevational view of the foot pedal and associated parts in a third position.

FIG. 7(b) is an elevational view of the outrigger wheel and associated parts in positions they may assume when the foot pedal is in the position shown in FIG. 7(a).

FIG. 8(a) is an elevational view of the foot pedal and associated parts in a fourth position.

FIG. 8(b) is an elevational view of the outrigger wheel and associated parts in positions they may assume when the foot pedal is in the position shown in FIG. 8(b).

DESCRIPTION

Figure 1:
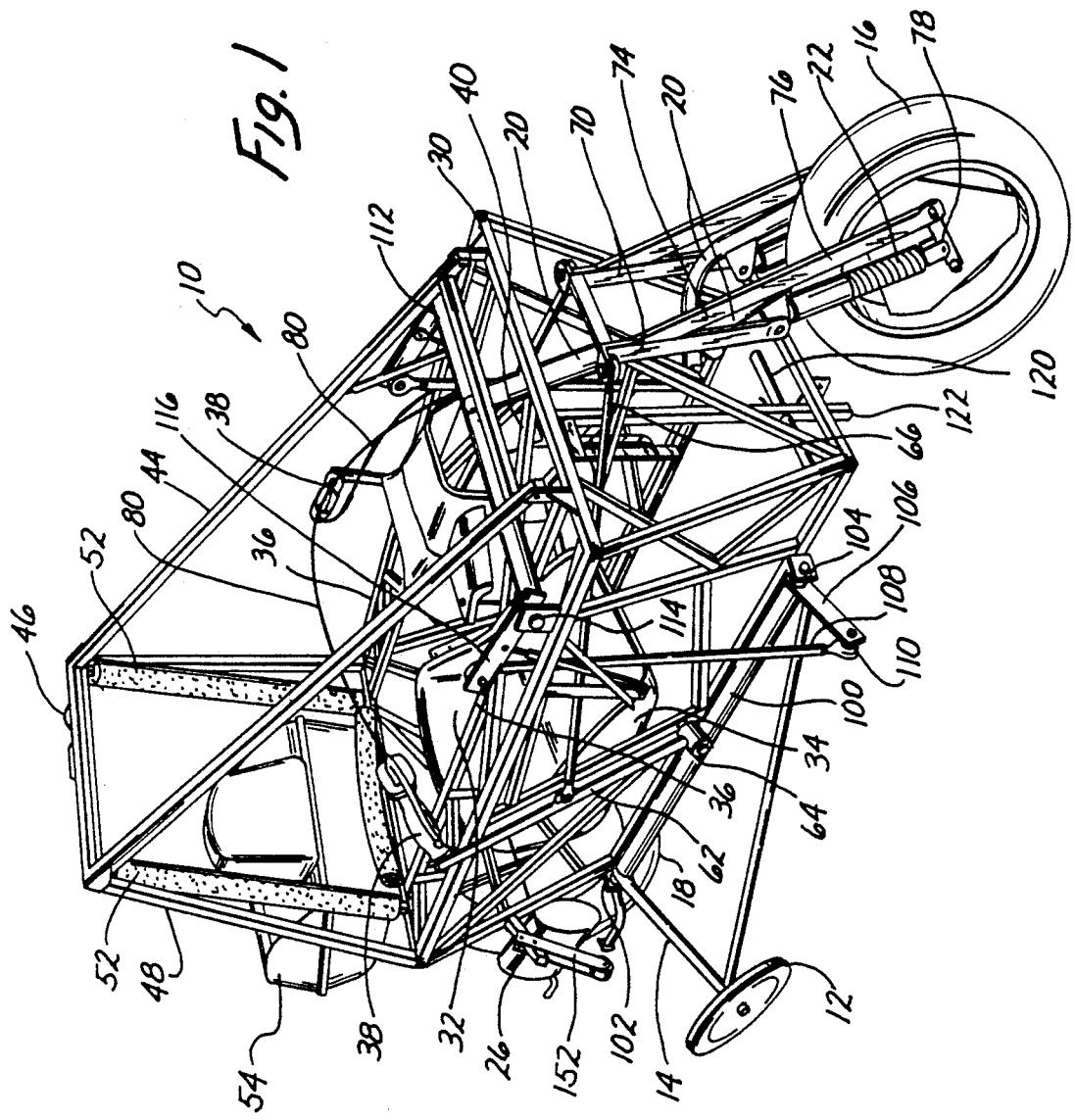
FIG. 1 is a perspective view of a specific embodiment of my new vehicle.

I will, first, describe the vehicle 10 in general and then, second, I will describe the mechanism for raising and lowering outrigger wheels 12 supported on arms 14.

Vehicle 10 is generally classifiable with two wheel vehicles such as motorcycles, scooters and the like with basically only two wheels, a forward wheel 16 and a rear wheel 18. In the prototype shown in the drawing, various parts were adapted from a Yamaha XC200 motor scooter including forward wheel 16, front fork and stem 20, front shock absorber 22, rear wheel 18, motor and case 24, muffler 26, rear shock absorber 28, etc. It is possible in production that some of these developed and proven parts in the scooter field can be used or adapted for use in my vehicle 10. This would avoid having to engineer and develop all parts independently.

The framework 30 of the vehicle is shown to be formed largely as trusses. Framework 30 has obvious functions in tieing together structures associated with front and rear wheels 16, 18, in forming a passenger compartment 32 (here shown as a one-person compartment), in supporting seat 34, etc. Notable in framework 30 is the two side frame trusses 36 disposed in a generally horizontal plane at about elbow height relative to the passenger (as indicated by the location of handgrips 38). These side frame trusses 36 are tied together at front and back by diagonal front frame members 40 and diagonal rear frame members 42 so as together to form a continuous truss which, among other structural purposes, helps define a protecting trusswork about passenger compartment 32 to help protect the passenger against side, front and rear forces in accident situations.

I am limiting this general description mostly to matters in which my invention is an improvement over prior inventions of others dealing with vehicles with a single front wheel, a single rear wheel and outrigger wheels. The drawings don't show and I will not describe many other details such as front windshield, general body panels, lights, other accessories, floor, etc. At least a partial top is preferable for driving in all types of weather and I have shown, to facilitate vehicle entry and exit, a pivotal top frame 44, a top latch 46, and a rear supporting frame 48. Frames 44, 46 also serve a purpose in accident roll situations like a rollbar in topless vehicles or a top in closed vehicles. How much side glass will be provided, if any, is optional. Top panels, front, back and side panels, and a floor may be integrated into framework 30, as is common in automobile manufacture, so that part of the strength of the frame is in formed and built up panels, etc, rather than in separate trusses per se.

A seatbelt 50 is provided. I show pads 52 on rear top supporting frame 48 to protect the occupant, who also should have a helmet. A rear mounted baggage compartment 54 is a useful accessory. A shoulder harness and an air bag also can be provided in order to improve the driver's crash protection.

I have provided a different form of steering than the handlebar found in motorcycles. I term this "side steering" in that steering is accomplished by a hand grip 38 on each side of the driver that are not directly connected to each other.

Figure 4:
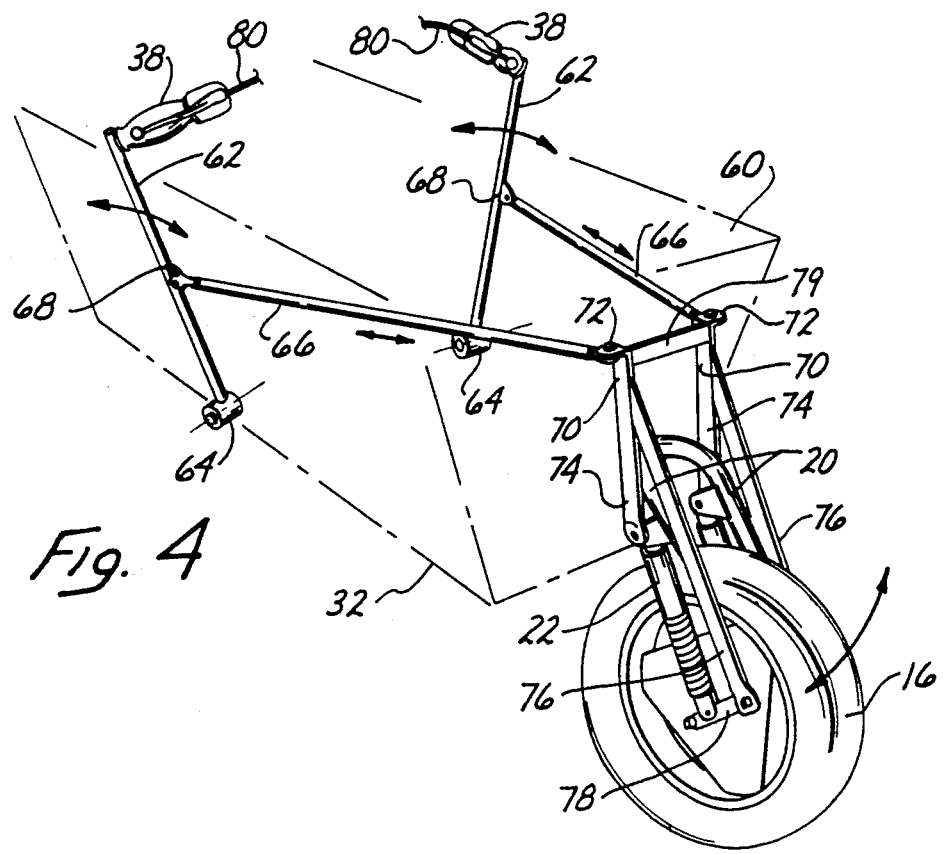
FIG. 4 is a perspective view of the steering components of the vehicle.

The steering system 60 is most easily understood from FIG. 4. Hand grips 38 are fixedly connected to and extend laterally inwardly from a pair of upright levers 62 pivotally mounted at 64 to framework 30, to pivot in planes extending primarily fore and aft of vehicle 10.

Generally horizontally extending connecting rods 66 have their rear ends pivotally connected at 68 to the vertically central portions of levers 62. An inverted U-shaped assembly 70 on each side has a upper end pivotally connected at 72 to the forward end of the associated connecting rod 66. A shorter leg 74 is connected to the assembly of the front fork 20 and front shock absorber 22. A longer leg 76 is connected to the front wheel axle 78. A member 79 connects together the upper ends of assemblies 70. It will be observed that hand grips 38 are indirectly connected together by connecting rods 66, assembly 70, and front fork 20.

When force is applied to one or both hand grips 38, one lever 62 will be pivoted forwardly and the other rearwardly. If force were applied by both hands simultaneously, one would be pushing and the other would be pulling. The movement of levers 62 results in a turning moment to front fork 20 and front wheel 16.

This side steering, without a centrally pivoted handle bar, makes driver exit from and entrance into passenger compartment 32 easier than if that obstruction were present. It provides the leg room necessary to operate landing gear and leaves room for an air bag restraint system. It also eliminates structure in front of the driver that could strike him in certain accident situations. A variable steering ratio is provided. The variable ratio steering system is provided by the inherent geometry of a bell crank push-pull tube system. The front end assembly could be re-engineered to integrate steering assembly 70 into the front fork and stem assembly 20.

Cable 80 extends from hand grips 38 to front and rear brakes. I have not shown a cable for the accelerator.

Figure 2:
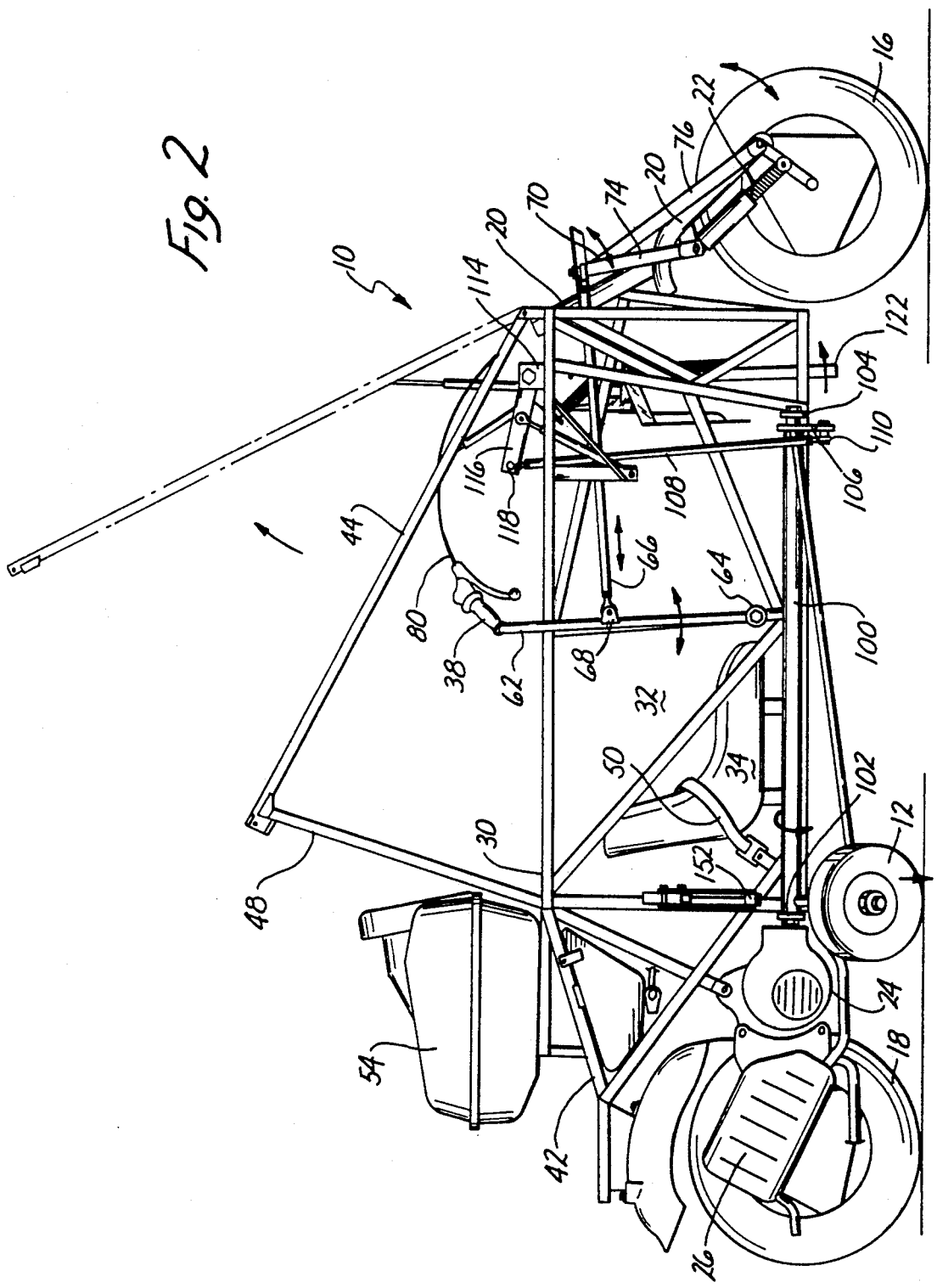
FIG. 2 is a side view.
Figure 3:
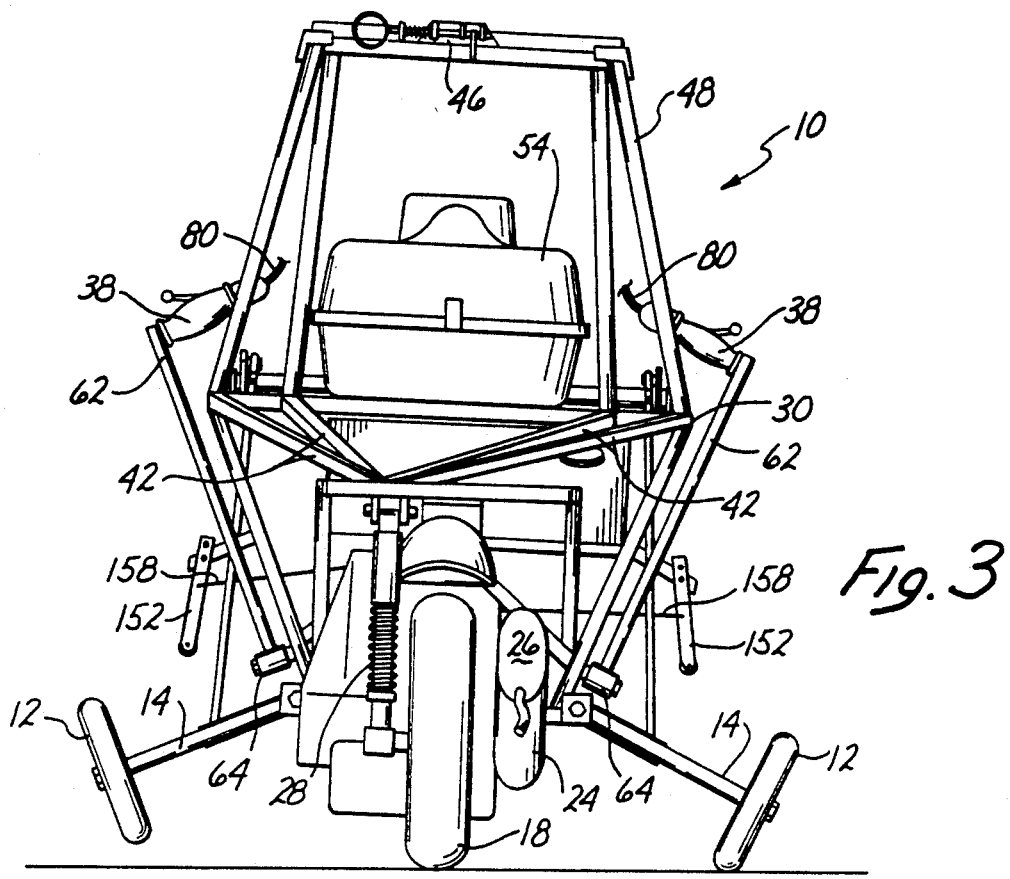
FIG. 3 is a rear view.

I will now describe the system for moving outrigger wheels 12 up and down. Wheels 12 are supported on arms 14 which are rigidly extending laterally from the rear portions of longitudinal torque tubes 100 pivotally supported at their rear ends at 102 and at their front ends at 104, as shown particularly in FIGS. 1 and 2. Rigidly extending laterally from the front portion of torque tubes 100 are crank arms 106. An upright connecting rod 108 is pivotally connected at its lower end at 110 to arm 106. A lateral torque tube 112 extends across the front upper frame work 30 and is pivotally supported on lugs 114. Rigidly attached to lateral tube 112 at each end is a crank arm 116 which is pivotally connected at its end 118 to connecting rod 108. It will be seen, thus, that the raising and lowering of outrigger wheels 12 depends on pivoting of crank arms 116 either driven by foot pedals or forced by springs.

Foot rests 120 for right and left feet extend from either side of the lower end of an upright foot pedal 122. Foot pedal 122 is pivotally connected at 124 sandwiched between a pair of plates 126 that are secured to lateral torque tube 112 and indirectly to crank arm 116 to pivot together. A tension spring 128 between foot pedal 122 and an arm 130 forming part of double plates 126 always tries to pull foot pedal 122 rearward towards the driver and against stop 127 (see FIG. 5a). Air spring 132 (FIG. 6a,b) is an extension spring common in automotive use in hoods and hatchbacks. Air spring 132 extends between crank arm 116 and an arm 134 fixed to the frame and always is trying to retract outrigger wheels 12 above the ground by pushing on crank arm 116 to act on connecting rod 108 to rotate torque tube 100 to raise wheels 12. Tension spring 136 acts between an attachment point on foot pedal 122 and the end of an arm 138 fixed to ratchet member 140. Ratchet member 140 is pivotally connected to foot pedal 122 at 142 (see FIG. 8a). Spring 136 always presses upper rest 144 or lower rest 146 of ratchet member 140 into engagement with a roller-type pawl 148 secured between plates 126.

Extension air spring 132 always is trying to retract outrigger wheels 12 (landing gear). Air spring 132 can be prevented from reaching its objective of retracting wheels 12 by foot pressure on rests 120 of foot pedal 122, which will hold wheels 12 in unretracted position by the action of roller pawl 148 engaged in upper rest 144 or lower rest 146 of ratchet member 140. In traveling down the road at normal speeds, wheels 12 should be fully retracted or raised. At rest or at very low speeds, wheels 12 should be held down as represented by roller pawl 148 engaged in lower rest 146 and by foot pedal 122 held fully forward by feet on foot rests 120 (FIGS. 8a and 8b). To park the vehicle upright, foot pedal 122 should be secured fully forward by latch 154, which is illustrated as having a hook shape and engaging rests 120 (see especially FIG. 8a).

Presuming the parts are in the FIG. 8a position, roller pawl 148 is engaged in lower rest 146 and outrigger wheels 12 are fully down as shown in FIG. 8b. Parts are locked in this position because roller pawl 148 is engaged in the lowermost rest 146 in ratchet member 140, and latch 154 is engaged to foot pedal 122. To release this the driver depresses foot pedal 122 in FIG. 8a, and the force of gravity releases hook latch 154. Upon removal of foot pressure, foot pedal 122 will retract against stop 127 by air spring 132 acting between arm 134 and crank arm 116. The driver then presses handle 180 toward handle 150 on ratchet 140 pushing both against foot pedal 122 thereby stretching tension spring 136 to permit ratchet member 140 to pivot away from pawl 148 to release from ratchet member 140 thereby permitting air spring 132 to act on crank arm 116 to rotate torque tube 100 to raise arms 14 supporting wheels 10. Actually, FIG. 8a represents when foot pedal 122 has been almost fully extended.

It may be said that my mechanism has a hierarchy of spring forces. The strongest spring force is extension air spring 132, always trying to retract wheels 12. The intermediate level spring force is tension spring 128 that always tries to retract foot pedal 122. Spring 128 is overcome by spring 132 during the process of retraction of the landing gear, whereupon the ratchet member 140 is forced from rest 146 to rest 144. The other two springs 136 and 164 are the weakest because their force collectively must be less than the force of air spring 132. In FIG. 7a, thus, when lever 180 is forced by hand or foot against lever 150 and together they are forced against lever 122, air spring 132 prevents the landing gear from going down. If the force of air spring 132 were not stronger than the collective force of springs 128 and 136 then instead lever 180 would not pivot on lever 122 and lever 122 would be forced forward and the landing gear would be forced down.

Suppose the vehicle 10 is in repose in the FIG. 8a position, then has the motor turned on and starts to move. During very low speeds, movement along the road surface with outrigger wheels down would be satisfactory, or if stopped at a stop light. Hook latch 154 will be released as the driver's feet press foot pedal 122 forward. When the speed reaches some level, say 10 miles per hour, outrigger wheels 12 no longer are needed and the wheels are raised first by release of foot pressure (position in FIG. 7a,b) and then retracted by pressing handles 180 and 150 against foot pedal 122, so that the FIGS. 5a and b parts relationships are assumed.

Figure 5B:
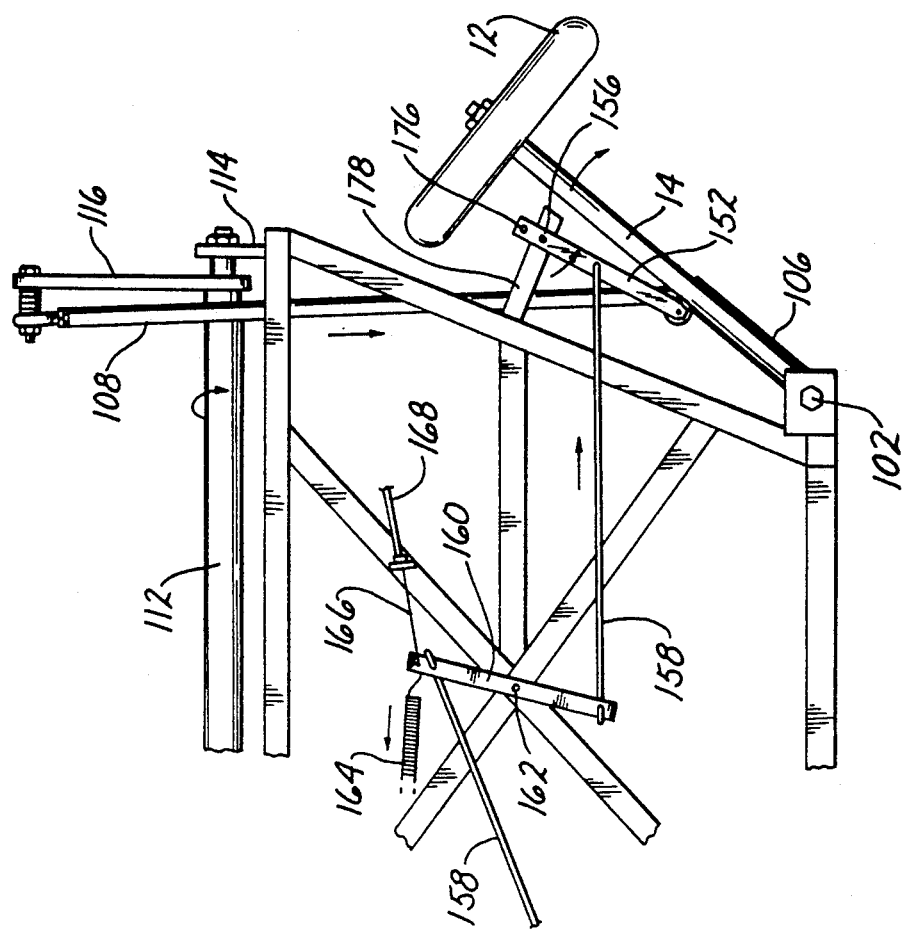
FIG. 5(b) is an elevational view of an outrigger wheel and associated parts in positions they may assume when the foot pedal is in the position shown in FIG. 5(a).
Figure 5A:
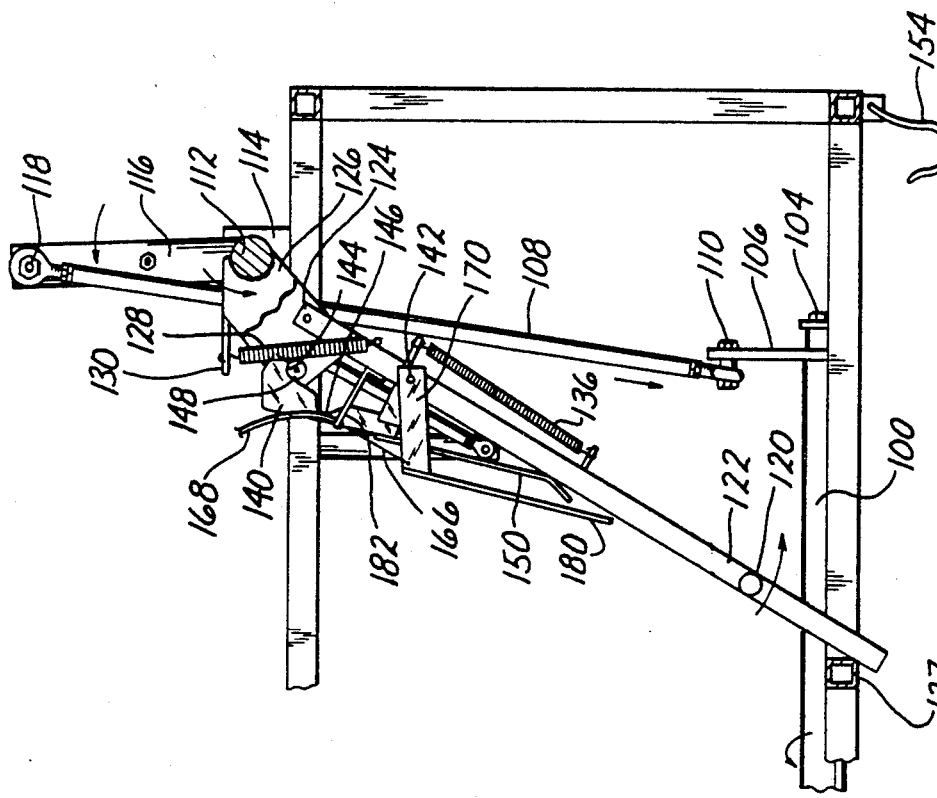
FIG. 5(a) is an elevational view of a foot pedal and associated parts.
Figure 9:
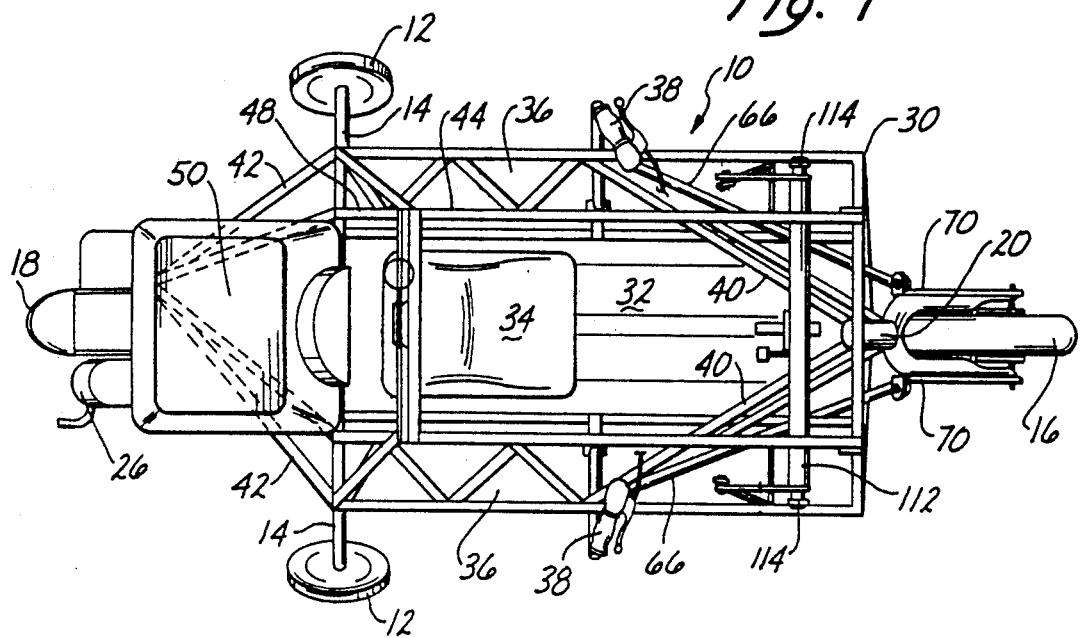
FIG. 9 is a top view of the vehicle.

When during travel the vehicle is slowed sufficiently or rough roads are encountered the outrigger wheels 12 may be brought part or all the way down by applying foot pressure on rests 120 to move the parts from the FIG. 5a position toward the FIG. 6a position. As the parts move from the FIG. 5a to the FIG. 6a position, ratchet 140 is engaged with pawl 148 so that plates 126, lateral torque tube 112, crank arm 126, connecting rod 108, longitudinal torque tube 110, and arms 14 lower outrigger wheels 12 to the partly down (or raised) position shown in FIG. 6b.

It will be noted at this point that a pawl lever 152 has assumed a position against arm 14 to prevent raising of outrigger wheels 12 (FIG. 6b). This is because two strokes of the foot pedal 122 is needed to fully lower outrigger wheels 12, and pawl lever 152 is holding wheel 12 which holds from retraction of the entire assembly. Foot lever 122 is free to pivot rearwardly to stop 127, driven by spring 128, when foot pressure is released. The driver depresses foot pedal 122 a second time to bring the parts to the FIG. 8b situation. I will later describe how pawl lever 152 comes into play.

With the parts in the FIG. 6a and b situation, the feet can be released from foot pedal 122 so that the parts can assume the FIGS. 7a and 7b positions. Note the parts are in the same positions in FIGS. 6b and 7b. As the parts move from the FIG. 6a to the FIG. 7a position, roller pawl 148 moves from upper rest 144 to lower rest 146. Pawl lever 152 is preventing various parts including longitudinal torque tube 100, rod 108, crank arm 116, plates 126 and air spring 132 from moving so that as spring 128 brings foot pedal 122 against stop 127, pawl 148 moves from engagement with upper rest 144 to engagement with lower rest 146. Now as foot pedal 122 moves from the FIG. 7a position to the FIG. 8a position the pawl 148 is engaged with lower rest 146 and outrigger wheel 12 can be moved by the force of feet on rests 120 of foot pedal 122 to the fully down position of FIG. 8b or to some place inbetween that might be desirable such as in turning a corner at slow speeds. Outrigger wheels 12 could be secured in the fully down position by engaging hook 154 with foot rests 120 as indicated in dotted lines in FIG. 8a.

The vehicle 10 is designed so that when outrigger wheels 12 are fully raised, the vehicle can lean as far as 40° to the vertical on either side which is necessary in moving around curves at normal speeds in dynamically balanced motorcyclic fashion.

It should be explained that the two-stroke foot pedal action is needed because there is a relationship between the force required to raise the vehicle from a 40° lean to a vertical position, the distance the foot rests 120 can be moved (considering the practical length of extension of the driver's foot, knee and leg), and the amount of force the leg muscles can be expected to apply. In the two-stroke mode of applying pressure to foot rests 120, approximately half the muscle power is needed. Experience with a prototype of vehicle 10 shows that the two-stroke foot pedal system is suitable for the leg muscle power of the average person. Whereas three strokes or more of foot pedal 122 would be theoretically possible, it would be best avoided because the driver could become confused whether he was in his first, second or third stroke of foot pedal 122.

Employment of variable leverage is necessary because less force is necessary to raise the vehicle incrementally (per degree) from 40° lean to vertical. In FIG. 5a, lever 116 is positioned to be almost parallel to push tube 108. The pivot point 118 moves in an arc which at this point is mostly to the rear and a little downward providing greatest leverage (the weight of the vehicle has less mechanical advantage). In FIG. 8a when the vehicle is upright and the least righting force is required, lever 116 is mostly perpendicular to push tube 108. The pivot point 118 moves in an arc which at this point is primarily downward providing less leverage (the weight of the vehicle has more mechanical advantage). The moment arm against which the driver's foot is applied is substantially constant but the moment arm is variable as to the application of the vehicle weight via rod 108 to crank arm 116.

It will be observed there is a pawl lever 152 on each side of vehicle 10, acting on arms 14 supporting wheels 12. Levers 152 are pivotally mounted at 156 to frame 30 and are connected together via rods 158 and a central lever 160 to which they are pivotally connected (and which is pivotally mounted at 162 to frame 30). Note that levers 152 have rollers at their ends to roll on arms 14.

Spring 164 acts on central lever 162 in a direction to extend them to their operative FIG. 6b position blocking arms 14 and wheels 12 from further raising, the position assumed between first and second depressions of foot pedal 122. A flexible tension cable 166 in a flexible cable sheathe tube 168 connects to central lever 162 oppositely to spring 164, i.e., they are both adapted to supply tension to lever 162 but in opposite directions. The other end of cable 166 secures to the pivotally mounted arm 170 shown in FIGS. 5a, 6a, 7, and 8a where its sequence of positions are shown.

When arms 14 and outrigger wheels 12 are forced downwardly by foot pressure on foot rests 120 through crank arm 116, connecting rod 108 and torque tube 100, spring 164 forces the roller ends of pawl levers 152 to press against arms 14, and follow the arms all the way from the FIG. 5b to the FIG. 6b position in which pawl levers 152 are oriented at generally right angles to arms 14 to block arms 14 from returning upwards. In fact, in the FIG. 6b position pawl lever 152 has gone over center relative to a line 172 going through the point of contact 174 of lever 152 with arm 14, pivotal center 156, and a point where pin abutment 176 at the upper end of lever 152 strikes arm 178 that supports lever 152. By going over center, it will be understood that pawl lever 152 tends to lock in the FIG. 6b position keeping outrigger wheel 12 from retracting.

Member 152 has been termed a "pawl lever" because it serves the functions of one of the pawls in a traditional ratchet and pawl to hold the parts from turning while the handle is being reversely turned so that the ratchet teeth can be grasped in a different location by another pawl in the ratchet and pawl mechanism. According to this analogy, roller 148 is the other pawl and rests 144, 146 are the teeth of a two tooth ratchet.

Returning to the FIG. 6b position, pawl lever 152 holds outrigger wheel 12 from raising while foot pedal 122 is being moved from its FIG. 6a position to its FIG. 7a position under the urging of spring 128 once the feet are removed from rests 120 or are moved rearwardly with pedal 122 as spring 128 urges it rearwardly. In the movement from FIG. 6a to FIG. 7a, roller pawl 148 has moved from engagement with upper ratchet rest or recess 144 to engagement with lower ratchet rest or recess 146. Then the foot pedal 122 can be forced forward again and the outrigger wheel 12 can be forced downwardly to the FIG. 8b fully down position while pawl lever 152 is left behind in the same position it had in FIG. 6b.

Pawl lever 152 is moved from its position in FIGS. 6b, 7b, and 8b back to its original position in FIG. 5b by the driver using foot pressure or hand pressure to press ratchet handle 150 and handle 180 (in the FIG. 7a positions) against foot pedal 122 as indicated in FIG. 5a which releases ratchet 140 and rest 144 from engagement with roller pawl 148 whereupon outrigger wheel 12 is free to retract and also handle 180 acts on arm 170 to pull on cable 166 to pull lever 160 to pull pawl levers 152 back from locked over-center position to their FIG. 5b positions to allow them to be driven by arms 14 to retract.

Note that a bracket 182 supports the end of flexible cable sheathe or tube 168 in FIGS. 5a, 6a, 7a, and 8a. If the feet pressure is removed from rests 120 in FIG. 8a, it will return to the FIG. 7a disposition, so that handles 180 and 150 can be pressed to foot pedal 122 (FIG. 5a). Note that as handle 180 is pressed toward foot pedal 122, handle 180 strikes ratchet handle 150 so that both are pressed against foot pedal 122.

Arm 170 of handle 180 can be pivoted to the same pin 142 to foot pedal 122 as arm 138 on ratchet 140. Instead they could be coaxial but separate pins or unaligned.

Figure 10:
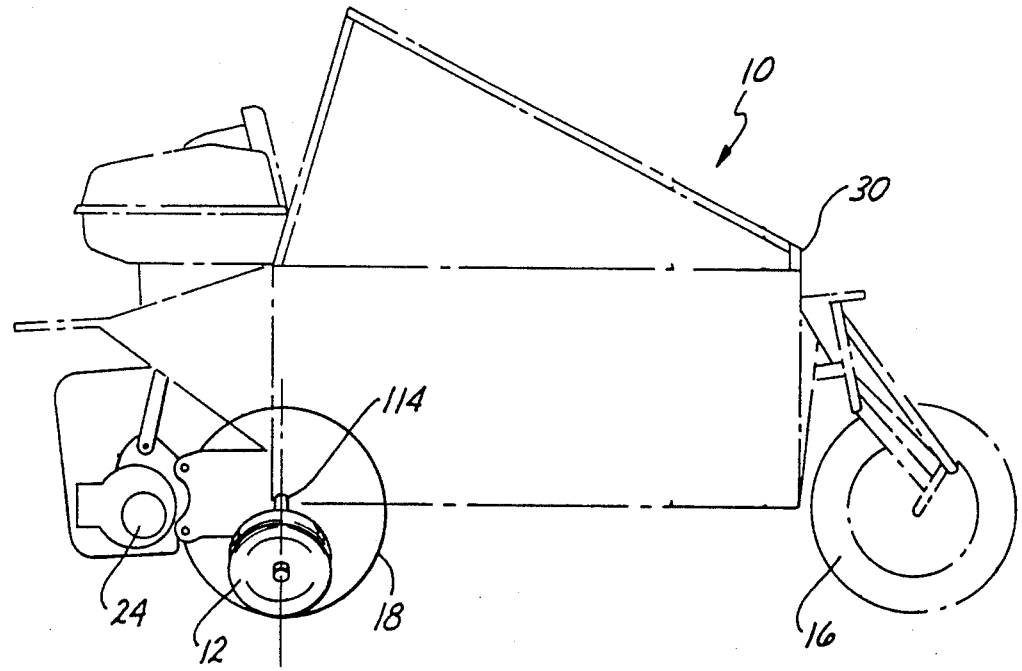
FIG. 10 is a side view of a modification, shown in full lines, to a vehicle shown in dashed lines.

To minimize tire wear on outrigger wheels 12 during turns, it would be desirable for the axles of wheels 12 to be in the same vertical plane lateral of vehicle 10 as the axle of rear wheel 18. This is illustrated in FIG. 10 which illustrates this being accomplished be reversing the normal relative locations of motor 24 and rear wheel 18. Usually in a motorcycle or scooter, the rear wheel is located behind (rearward relative to) motor 24, whereas in FIG. 10 rear wheel 18 is located forward relative to motor 18. This also has the advantage that as power is applied by motor 24 to rear wheel 18, the rear end of vehicle 10 will tend to squat.

Normal practice in motorcycles is to locate the rear wheel swing arm pivot in front of the rear wheel. The dynamics of this design cause the rear end of the motorcycle to rise on acceleration, especially if the swing arm pivot is substantially higher above the ground then the rear wheel axle. The optimum design for my vehicle is to put the rear wheel swing arm pivot behind the rear wheel, causing it to squat on acceleration. This is because the landing gear must be extended during initial acceleration to maintain the vehicle upright if the traditional motorcycle design is used. The improved design squats during initial acceleration, forcing the vehicle more upright on the landing gear, making transitioning from the unbalanced mode to the balanced mode easier, and requiring less landing gear travel.

Having thus described my invention, I do not wish to be understood as limiting myself to the exact details described, but instead wish to cover those modifications thereof that will occur to those skilled in this art upon examining my disclosure and which are properly within the scope of the following claims.

I claim:

1. A vehicle, comprising:

a frame encompassing a driver compartment and having front and rear portions and sides, said frame including horizontal side trusses disposed generally in a horizontal plane and located on each side of said driver compartment at substantially elbow height relative to the driver and a plurality of frame members at the front and back of said driver compartment tying together said side trusses, thereby forming a generally horizontal truss work about said compartment to protect the driver, said frame further including overhead frame means attached to said horizontal side trusses for forming a crush resistant roll cage structure therewith about said driver;

a driver seat mounted on said frame and adapted to receive said driver in a substantially sitting position;

a single front wheel mounted on said front portion of said frame and a single rear wheel mounted on said rear portion of said frame, said front and rear wheels being substantially aligned along the longitudinal axis of said frame for providing dynamic balance for said vehicle when traveling;

means including a pair of side wheels mounted on said frame for permitting said frame to tilt from an angle of 0 degrees to at least 40 degrees from the vertical without touchdown of said side wheels in turns while said vehicle is in dynamic balance at road speeds, such that premature touchdown of said wheels does not cause loss of vehicle control, and for catching said vehicle only upon loss of tire traction so that said vehicle travels in a steerable, three-wheeled mode; and means including a mechanical element for selectively positioning said side wheels, at least in part, through operator-applied force on said mechanical element, to (i) a first extended position in which said side wheels extend away from said vehicle and may touch the ground in order to assist said front and rear wheels in holding the vehicle upright when said vehicle is slowing or stopping, and (ii) a second retracted position fixed adjacent said vehicle and projecting away from said sides when said vehicle is in dynamic balance, said second retracted position both (a) allowing said vehicle to lean in a dynamically-balanced condition at an angle of 40 degrees or more from the vertical to corner turns, and (b) allowing said vehicle to be caught when tire traction is lost and to thereafter assume the steerable, three-wheeled mode of travel, said positioning means further providing feedback through said mechanical element to said operator indicative of how close said vehicle is to dynamic balance, such that the driver can detect when to retract said side wheels without effect on the direction of travel of said vehicle.

2. A vehicle, comprising:

a frame encompassing a driver compartment and having front and rear portions and sides, wherein said frame includes a plurality of horizontal structural members located around the periphery of the driver compartment and cooperating to form a driver protective crush-resistant structure for protecting the driver from crushing forces in a horizontal plane at substantially elbow height relative to the driver, said frame further including overhead frame means cooperating structurally with said structural members for forming a crush resistant roll cage structure therewith about said driver;

a driver seat mounted on said frame and adapted to receive said driver in a substantially sitting position;

a single front wheel mounted on said front portion of said frame and a single rear wheel mounted on said rear portion of said frame, said front and rear wheels being substantially aligned along the longitudinal axis of said frame for providing dynamic balance for said vehicle when traveling;

means including a pair of side wheels mounted on said frame for permitting said frame to tilt from an angle of 0 degrees to at least 40 degrees from the vertical without touchdown of said side wheels in turns while said vehicle is in dynamic balance at road speeds, such that premature touchdown of said wheels does not cause loss of vehicle control, and for catching said vehicle only upon loss of tire traction so that said vehicle travels in a steerable, three-wheeled mode; and means including a mechanical element for selectively positioning said side wheels, at least in part, through operator-applied force on said mechanical element, to (i) a first extended position in which said side wheels extend away from said vehicle and may touch the ground in order to assist said front and rear wheels in holding the vehicle upright when said vehicle is slowing or stopping, and (ii) a second retracted position fixed adjacent said vehicle and projecting away from said sides when said vehicle is in dynamic balance, said second retracted position both (a) allowing said vehicle to lean in a dynamically-balanced condition at an angle of 40 degrees or more from the vertical to corner turns, and (b) allowing said vehicle to be caught when tire traction is lost and to thereafter assume the steerable, three-wheeled mode of travel, said positioning means further providing feedback through said mechanical element to said operator indicative of how close said vehicle is to dynamic balance, such that the driver can detect when to retract said side wheels without effect on the direction of travel of said vehicle.

* * * * *